(12) United States Patent
Vaghefi et al.

(10) Patent No.: US 6,429,851 B1
(45) Date of Patent: Aug. 6, 2002

(54) CHILD FRIENDLY COMPUTER MOUSE

(76) Inventors: Kimberly Vaghefi; Farid Vaghefi, both of 25974 Clifton Pl., Stevenson Ranch, CA (US) 91381

( * ) Notice: Subject to any disclaimer, the term of this patent is extended or adjusted under 35 U.S.C. 154(b) by 0 days.

(21) Appl. No.: 09/373,922

(22) Filed: Aug. 12, 1999

(51) Int. Cl.⁷ ............................................. G09G 5/08
(52) U.S. Cl. .................................. 345/163; D14/402
(58) Field of Search ..................... 345/163; D14/402, D14/403, 432, 440; 200/333; 446/99, 100, 321

(56) References Cited

U.S. PATENT DOCUMENTS

| | | | |
|---|---|---|---|
| 4,773,888 A | * 9/1988 | Worsham et al. | |
| 5,245,146 A | 9/1993 | Florence | 200/333 |
| D361,559 S | 8/1995 | Siano | D14/114 |
| D362,242 S | 9/1995 | Siano | D14/114 |
| D369,154 S | 4/1996 | Powell | D14/114 |
| D370,219 S | 5/1996 | Blumer et al. | D14/114 |
| D371,772 S | 7/1996 | Bird et al. | D14/114 |
| D374,001 S | 9/1996 | Vance | D14/114 |
| D386,160 S | 11/1997 | Young | D14/114 |
| D387,338 S | 12/1997 | Leifer | D14/114 |
| 5,692,956 A | * 12/1997 | Rifkin | 345/163 |
| D398,297 S | 9/1998 | Leifer | D14/114 |
| D400,194 S | 10/1998 | Leifer | D14/114 |
| D404,027 S | 1/1999 | Bush | D14/114 |
| 5,897,420 A | * 4/1999 | Lawrence et al. | 446/321 |
| 6,099,934 A | * 8/2000 | Held | 200/333 |

FOREIGN PATENT DOCUMENTS

JP 8-76919 * 3/1996

* cited by examiner

*Primary Examiner*—Regina Liang
(74) *Attorney, Agent, or Firm*—Koppel, Jacobs, Patrick & Heybl; Michael J. Ram (57) ABSTRACT

A graphic user interface, such as a standard functioning mouse or track ball, which has the shape and/or appearance of various different characters, such as animals and which may be sized for use by children. The graphic user interface also has various removable and interchangable parts so that its appearance can be changed without interfering with functioning of the device. The graphic user interface can have added features such as sound an/or light generating features so that normal operation of the buttons causes the production of a sound or sounds which depends on the shape applied to the graphic user interface. Depressing the buttons can also cause bulbs or LCDs positioned on the graphic user interface body, particularly in the eyes of the character, to light. Additionally, one or more graphic user interfaces incorporating features of the invention can be connected in tandem with a standard mouse so that users could alternatively use a normal graphic user interface without the necessity of disconnecting the added graphic user interface.

9 Claims, 9 Drawing Sheets fig. 3 fig. 5

CHILD FRIENDLY COMPUTER MOUSE

BACKGROUND OF THE INVENTION

Data input devices have been used since the sixties as a graphic user interface (GUI) to allow a user to input certain information into computer systems and to modify or operate on images or information displayed on an output screen attached to the computer system. Examples of input devices are trackballs, computer mice, and graphic tablets. These input devices translate motion applied to the input device into digital data bits delivered to the computer system and allow an individual to communicate with computers. "Mouse" is the terminology used in computer science to refer to a pointing device which is slid along a flat surface causing a ball extending out of a lower surface of the device to rotate and, in turn create x and y output signals as a result of said movement, the signals causing a cursor on the connected computer screen to move and allows the user to point to objects on the screen. (See U.S. Pat. No. 3,987,685 to Opocensky.) The mouse also incorporates at least two buttons which are electronically connected to the computer system such that a single or double depression (click) of each button causes a specific action or interaction to occur on the screen.

An alternative mechanical pointing devices use a ball and track assembly to transfer hand or finger generated movement on the ball and communicate it to the computer. In a track ball system a stationary body encloses electronic circuitry to generate an output signal similar to that of a mouse for transmission to a computer. A moveable ball mounted in the body and extending above the body is rotated by the user. This movement, in turn, drives the electronic x and y components in the base. Buttons similar to those on a mouse are used to input and activate certain sequences corresponding to the graphical command chosen.

More recent developments include mechanical pointing devices which have optical, optomechanical, or pressure sensitive pads as pointing or input devices. The signal from the GUI may be transmitted from the GUI to the computer electronics by a hard wire connection or other transmission means which use optical outputs, such as focused UV visible or IR light beams, or radio frequency transmission such as FM or microwave, or other suitable methods of transmitting information over distances without a hard cable linkage.

In the past, the use of computers was limited to professionals who used them at work or could afford them at home. With the recent drop in computer prices and the integration of computers in children's education, computers have become a part of mainstream culture. The average age of these computer users is constantly dropping especially with the increase of the software market targeted at families and young children Software even exists for pre-verbal children. However, these children have to deal with computer components that have been designed for adults. In the current market, computer mice fit under the palm of an adult's hand, but prove difficult for children to use. Therefore, there is a need for a GUI designed particular for use by children and, in particular a mouse that is not only made with the smaller hands of the younger generation in mind but will also be of a form, shape and function to attract the attention of children.

DESCRIPTION OF THE PRIOR ART

The prior art is replete with patents and disclosures of different shaped and appearing mouses and track balls as well as the electronic and mechanical features of the devices.

Also there are various design patents to computer mice or track balls in the shape of various objects such as cars (U.S. Pat. No. 5,245,146, U.S. Pat. No. Des. 374,001, U.S. Pat. No. Des. 404,027), surf boards (U.S. Pat. No. Des. 371,772), a baseball cap (U.S. Pat. No. Des. 386,160) or football helmet (U.S. Pat. No. Des. 369,154), various sport balls (U.S. Pat. No. Des. 362,242, U.S. Pat. No. Des. 361,559), movie characters such as Micky Mouse (U.S. Pat. No. Des. 370,219) and Star War characters as well as certain animals (U.S. Pat. No. Des. 387,338, U.S. Pat. No. Des. 398,297, U.S. Pat. No. Des. 400,194,). However, these devices function in the same manner as the prior art mice or track balls, portions of the design being buttons functioning in the same manner as the buttons on the prior art devices, the primary difference being the surface features and appearances. Also cloth or plastic covers for the mouse are also available, such as a cloth mouse which, when attached, makes the computer mouse appear like a stuffed animal mouse.

SUMMARY OF THE INVENTION

The invention comprises a standard functioning mouse or track ball (a GUI) that has the shape and/or appearance of various different characters, such as animals and is sized for use by children. The GUI also has various removable and interchangable parts so that the appearance of the GUI can be changed without interfering with its function. The GUI can have added features such as sound an/or light generating features so that normal operation of the buttons causes the production of a sound or sounds which depends on the shape applied to the mouse. Depressing the buttons can also cause bulbs or LCDs positioned on the mouse body, particularly in the eyes of the character, to light. As a further added feature one or more GUI an be connected in tandem with a standard mouse so that an adult user could alternatively use a normal mouse without the necessity of disconnecting the children's mouse.

DETAILED DESCRIPTION OF THE INVENTION

Due to the popularity of animals with children, the invention contemplates a computer mouse formed in the shape of animals or other popular characters. However, as an added feature to provide children with an added level of creativity and interaction, the mouse also provides the opportunity for the user to use interchangeable parts to form different animals and characters using the same mouse.

While the GUI is described in regard to an animal shaped computer mouse with interchangeable parts it must be recognized that any shaped mouse can be formed. For example, the mouse may be in the shape of a face, various different cartoon characters, different animals, objects, ships, or other popular images. Further the same concept may be adapted to track balls. Still further, rather then replacing an existing mouse a cover can be provided that adds the ability to reconfigure the appearance of an existing mouse without interfering with its functionality.

Shown in FIGS. 1–5 is a first embodiment of a child friendly computer track ball embodying features of the invention. Five views are shown of the GUI in the shape of a turtle, comprising a body portion 10, with appendages, namely a head 12, feet 14 and tail 16, all of which are detachable from the body and replaceable by a head, feet, and tail from different animal characters. The tail 16 is usually mounted on or over the wire connecting the GUI to the computer. While not shown in these Figures, other body appendages, such as ears or wings can also be removeably attached or components of the appendages, such as eyes, nose, ears, teeth, toes, etc. can be interchangeable or items can be added such as eye glasses, ties, shoes, hair, etc The GUI control ball 18 is exposed through the top surface of the body 10. The various removable parts can be attached to the body by various different means such as a mechanical clip 20, hook and loop fasteners, commonly referred to as Velcro® fasteners, snaps, ball and socket connectors and other well known attachment devices easily handled by children. The left and right buttons 22, 24, normally a part of a standard mouse or trackball are preferentially located in the forward half of the body portion 10 and function in the same manner as currently available devices. However, the buttons may alternatively be located within the detachable head, for example as the eyes or the ears of the figure, or on the rear portion of the body 10. Having the buttons on an added piece requires the attachment means to also include electrical connectors so that activation of the buttons located within the head are transmitted, through the body portion 10 to the computer control section.

Figure 1:
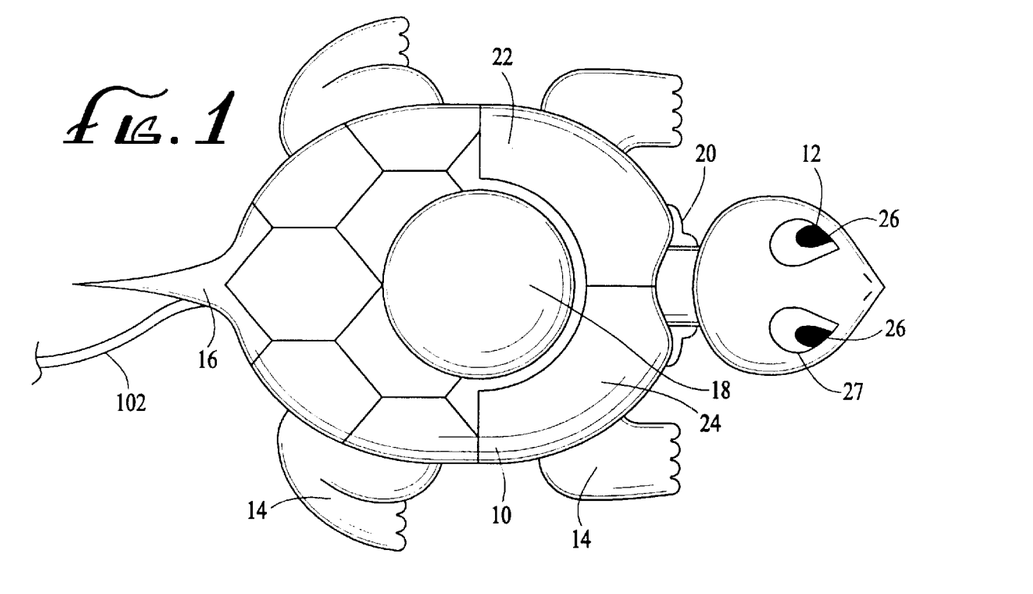
FIG. 1 is a top view of a turtle shaped track ball GUI embodying features of the invention.
Figure 2:
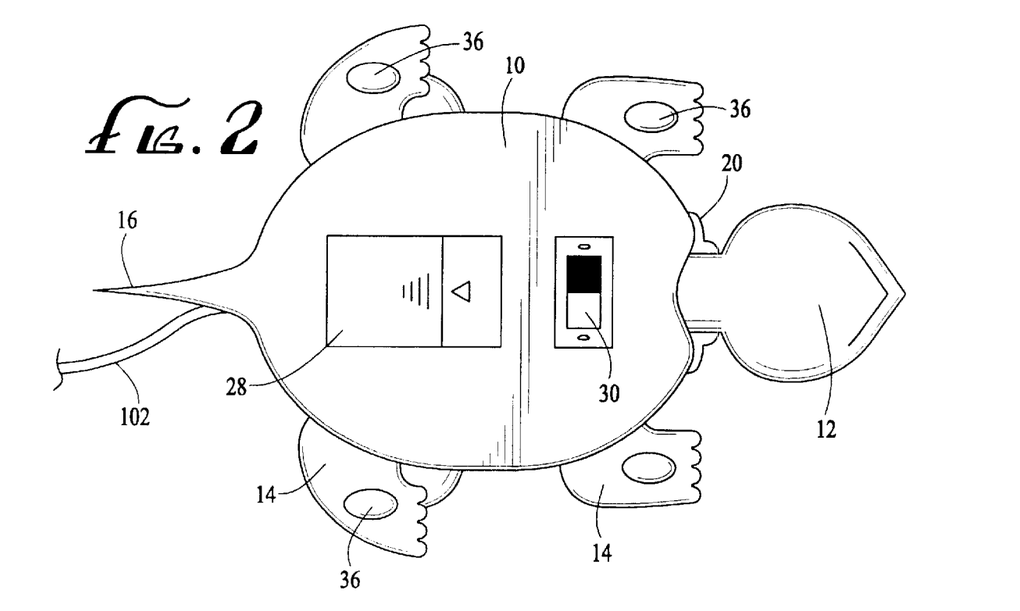
FIG. 2 is a bottom view of the turtle shaped track ball GUI of FIG. 1.
Figure 3:
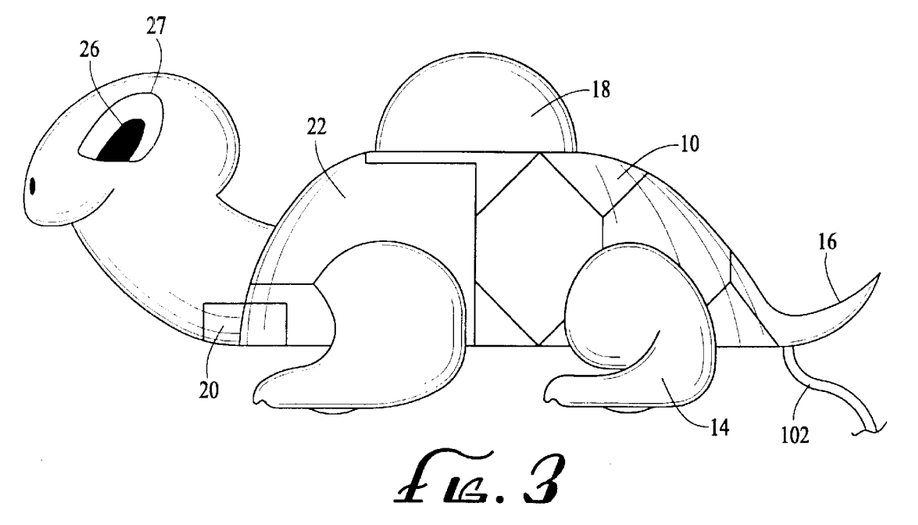
FIG. 3 is a side view of the turtle shaped track ball GUI of FIG. 1.
Figure 4:
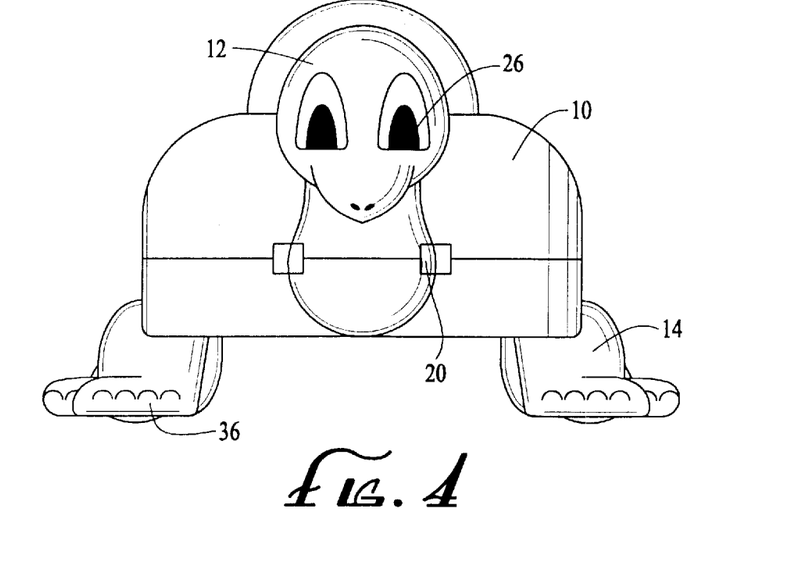
FIG. 4 is a front view of the turtle shaped track ball GUI of FIG. 1.
Figure 5:
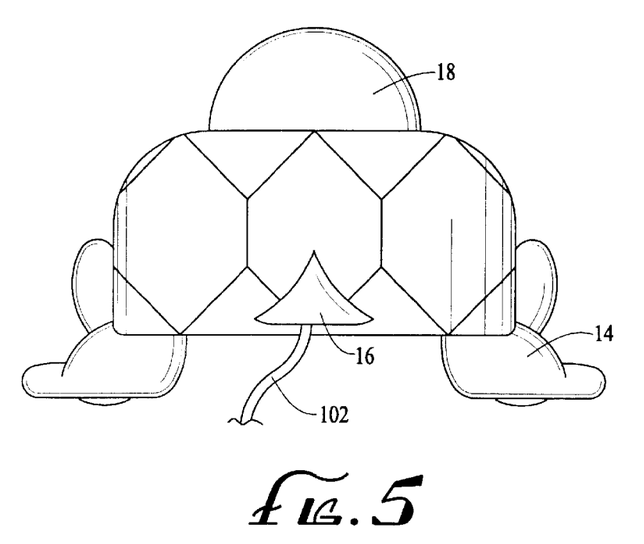
FIG. 5 is a rear view of the turtle shaped track ball GUI of FIG. 1.

Features which may be added to the device include sound generating means 32 or illuminating devices 26, which may be bulbs or LCD displays, so that activation of the left or right button will also cause the bulb or LCD to illuminate. Referring to FIG. 2, a GUI incorporating the invention may also include a battery compartment 28 to enclose a separate power source to power the light bulbs, LCD and/or sound generating devices enclosed within the body 10. The illuminated devices 26 may be located in the eyes 27 of the animal. This also requires that the attachment means include an electrical connection. Alternatively, the bulbs or LCD may be added to the body to create a light display on the surface of the body 10. Still further, depressing one of the buttons can trigger a sound, which may typically be related to the animal represented by the computer mouse. For example, a cat may meow or a dog may bark. Means, such as a sound chip or magnetic recording tape system 32 and speaker 34, may also be provided to cause sounds to emanate from the computer mouse, or the computer to which it is attached, when the track ball is rotated. Or, in the case of a computer mouse, when the mouse is moved on the desk top. To do so, as shown schematically in FIG. 17, as the xy generator creates and sends a signal to the computer, and the buttons 22, 24 activate a function in the computer, each simultaneously sends a signal to the illuminating device 26 and sound generating device 32 to activate them as appropriate.

Figure 17:
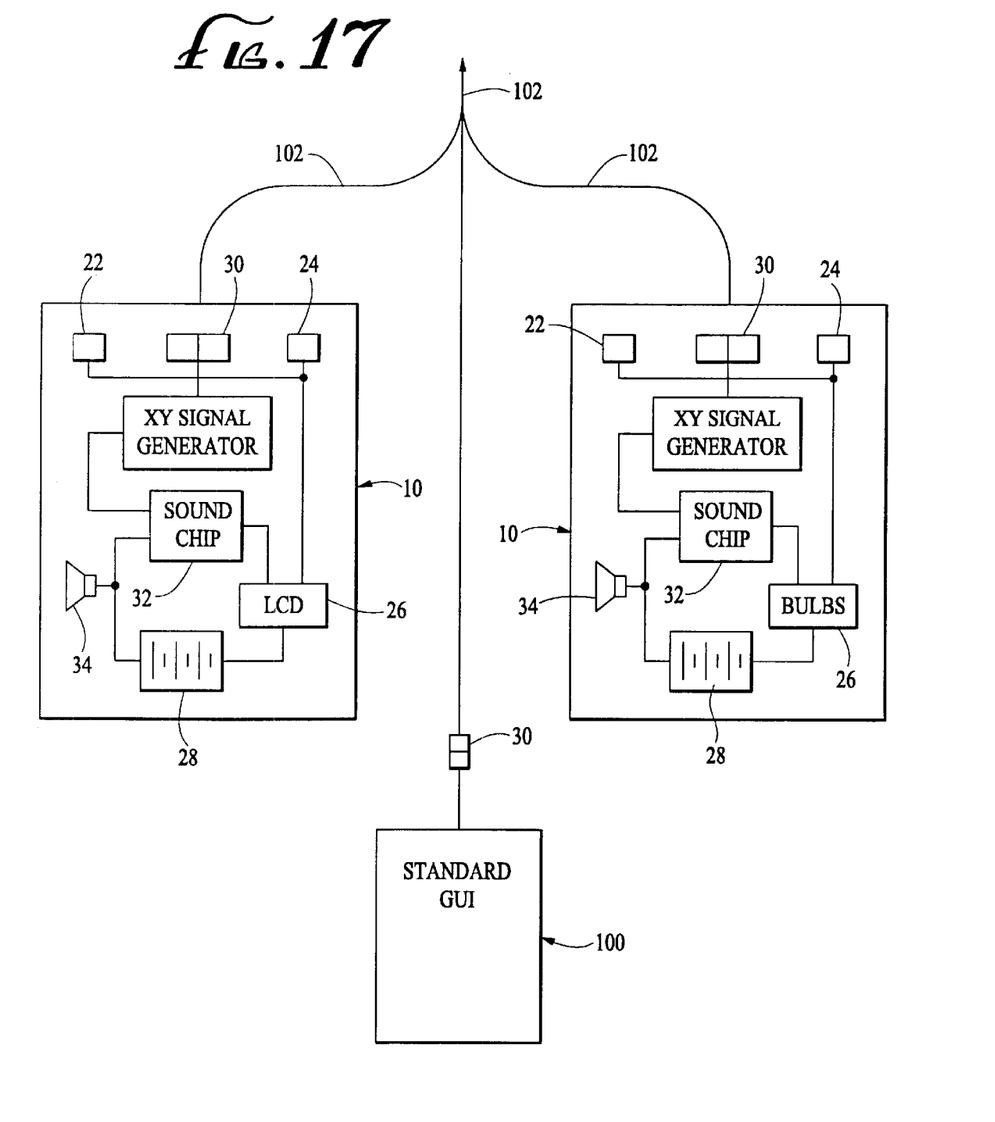
FIG. 17 is a schematic drawing showing a standard GUI and two GUIs incorporating features of the invention interconnected for alternative control of a computer.

The GUI may also include an on/off switch which will allow the various battery powered features to be turned on or off or the mouse to be disconnected from the computer to allow an alternate mouse, such as might be used by an adult user of the computer or a second child with a second GUI incorporating features of the invention, to be used with the computer. FIG. 17 is a schematic representation of a system which incorporates two devices 10 incorporating features of the invention and a third standard device 100. The three devices are all attached by a connection 102 to a computer for alternative control of the computer. Each GUI 10, 100 includes an on/off switch 30 so that the signal from two of the devices is stopped from being transmitted to the computer and only the third device sends instructions to the computer at a time. Of course, in accordance with the teachings of the invention, any number of GUI can be interconnected in this manner as long as only one device is transmitting directions to the computer at a time. Alternatively, the computer can be programmed to accept input from two different GUI.

A still further part which may be added to the GUI 10 are pads 36, in the case of a track ball to aid in keeping the body 10 stationary on the table top, or small rollers 38 or low friction pads, in the case of a mouse, to aid in moving the mouse across a mouse pad or table top.

Figure 6:
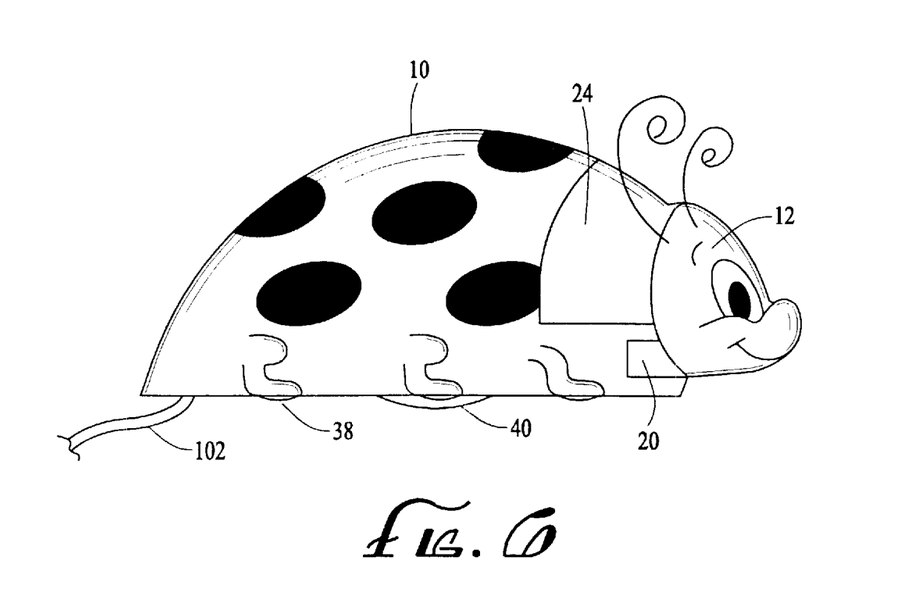
FIG. 6 is a side view of a lady bug shaped mouse.
Figure 7:
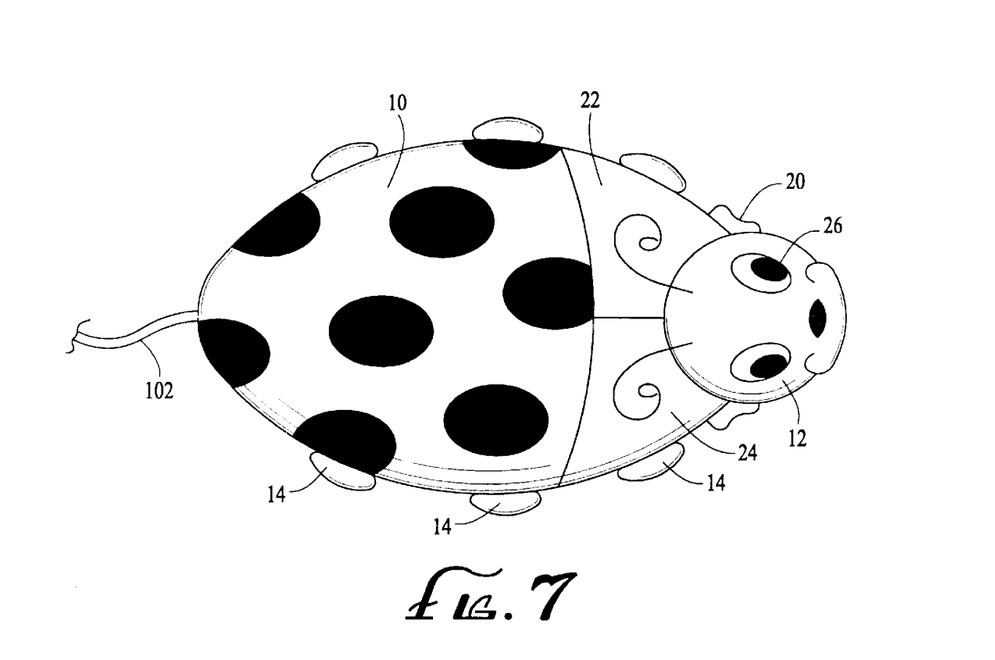
FIG. 7 is a top view of the lady bug shaped mouse of FIG. 6.
Figure 8:
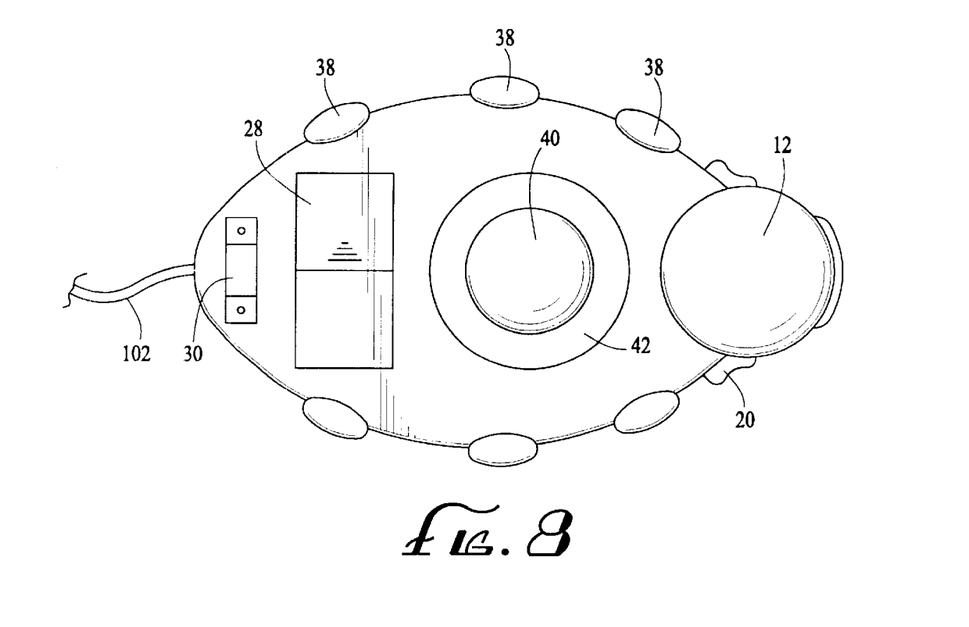
FIG. 8 is a bottom view of the lady bug shaped mouse of FIG. 6.

FIGS. 6–8 illustrate a second embodiment of the invention. Like components are numbered the same as in FIGS. 1–5. FIG. 6 is a top view of a computer mouse in the shape of a lady bug. As in the previous embodiment, the head 12, feet 14 and tail 16 are removable. FIG. 7 shows the on/off switch 30 and the roller ball 40 held by a retainer ring or ball enclosure 42. In this instance the pads on the feet may be replaced by small rollers.

Figure 9:
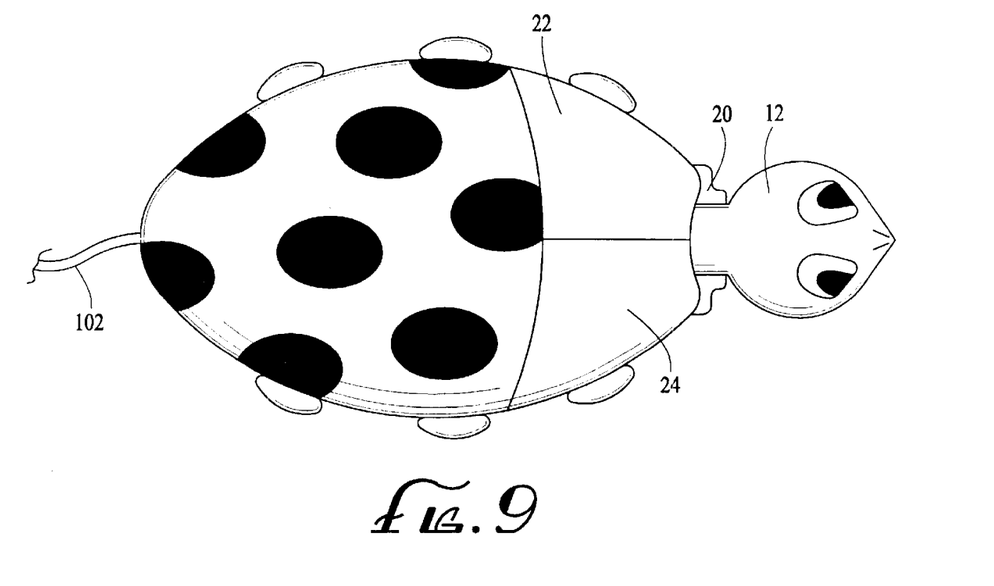
FIG. 9 is a top view of the lady bug shaped mouse of FIG. 6 with the head thereof replaced with the turtle head of FIG. 1.

FIG. 9 illustrates the interchangeability of the parts between the track ball and computer mouse, the lady bug head being replaced by the turtle head.

Figure 10:
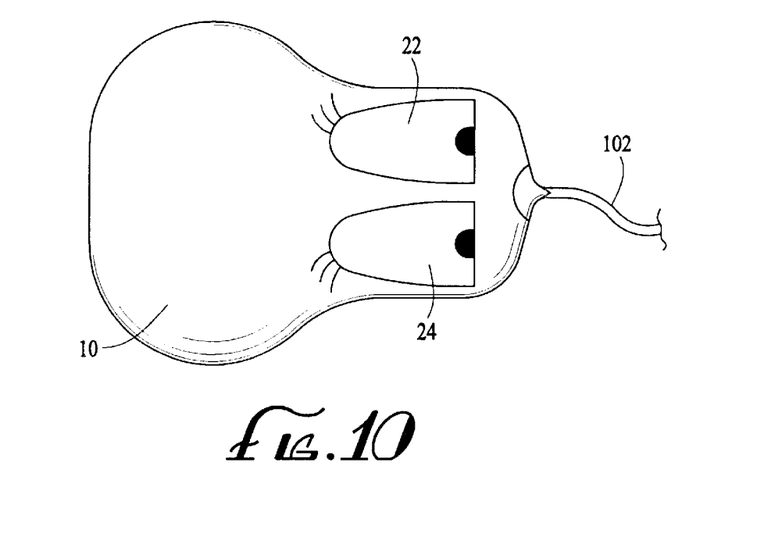
FIG. 10 is a top view of a bird with worm computer mouse.
Figure 11:
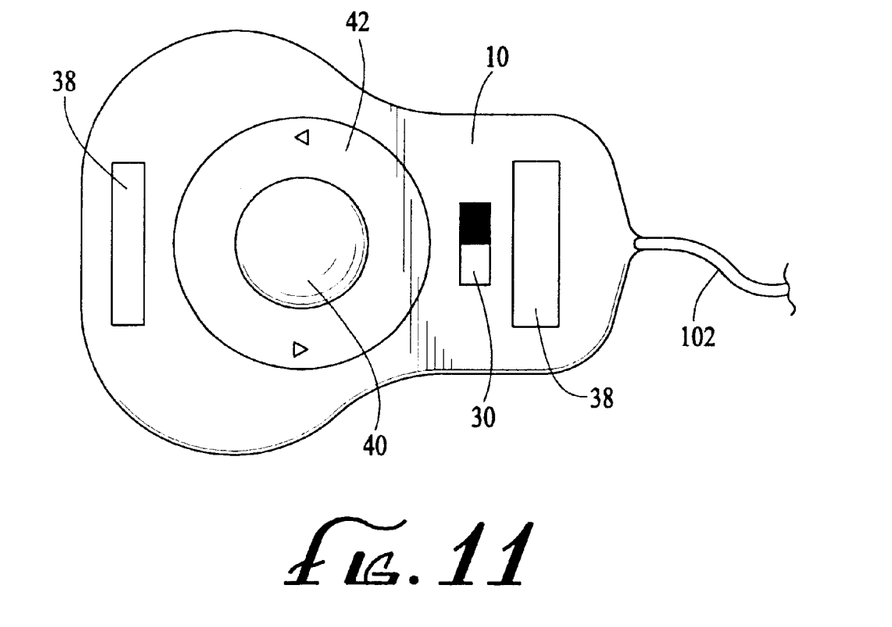
FIG. 11 is a bottom view of a bird with worm computer mouse of FIG. 10.
Figure 12:
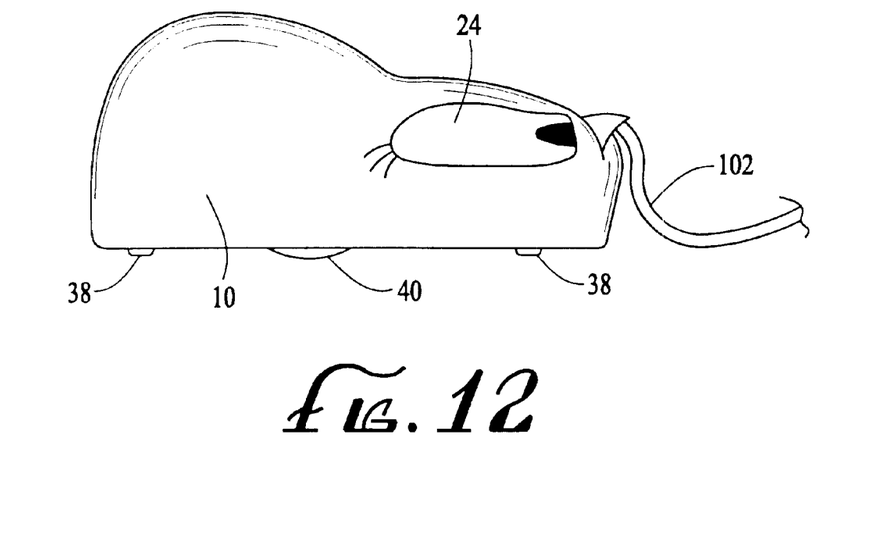
FIG. 12 is a side view of a bird with worm computer mouse of FIG. 10.

FIGS. 10–12 are to a third embodiment of a computer mouse in the shape of a bird with a worm. In this instance the eyes of the animal are the right and left buttons 22, 24 and the lead 102 exits from under the beak of the bird and has the appearance of a worm.

Figure 13:
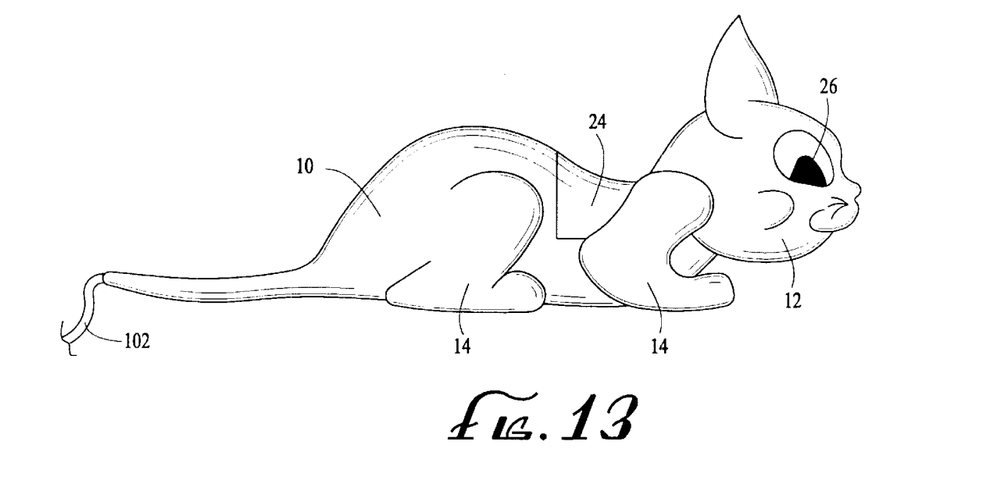
FIG. 13 is a side view of a cat shaped computer mouse.
Figure 14:
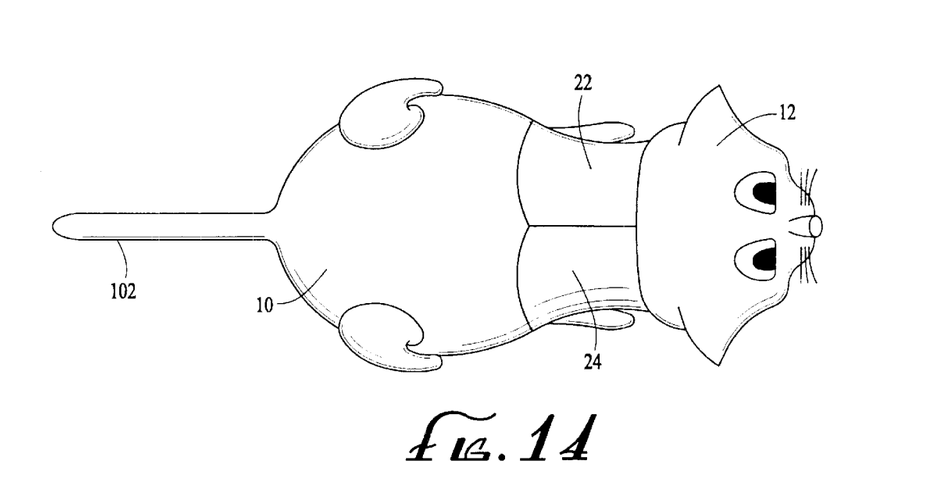
FIG. 14 is a top view of the cat shaped mouse of FIG. 13.
Figure 15:
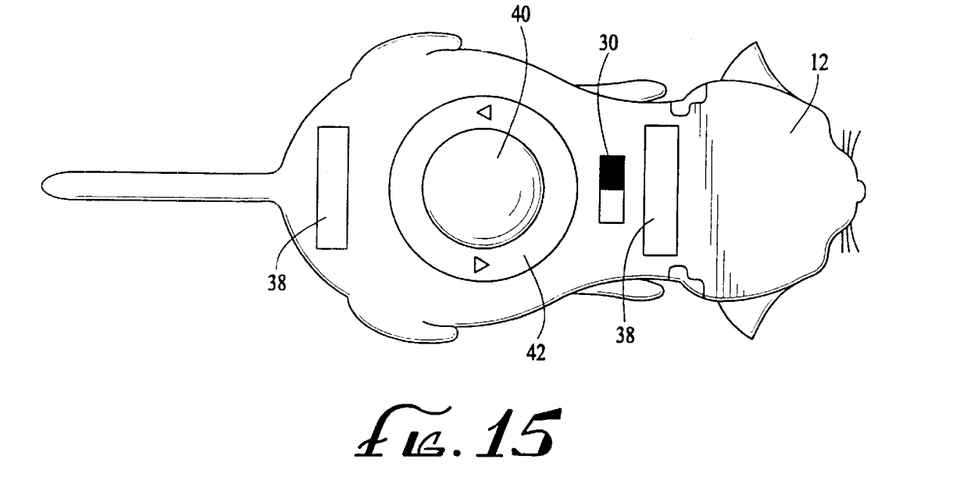
FIG. 15 is a bottom view of the cat shaped mouse of FIG. 13.

FIGS. 13–15 are to a still further embodiment having the appearance of a cat. This embodiment has the same features functioning in the same manner as the prior described embodiments.

Figure 16:
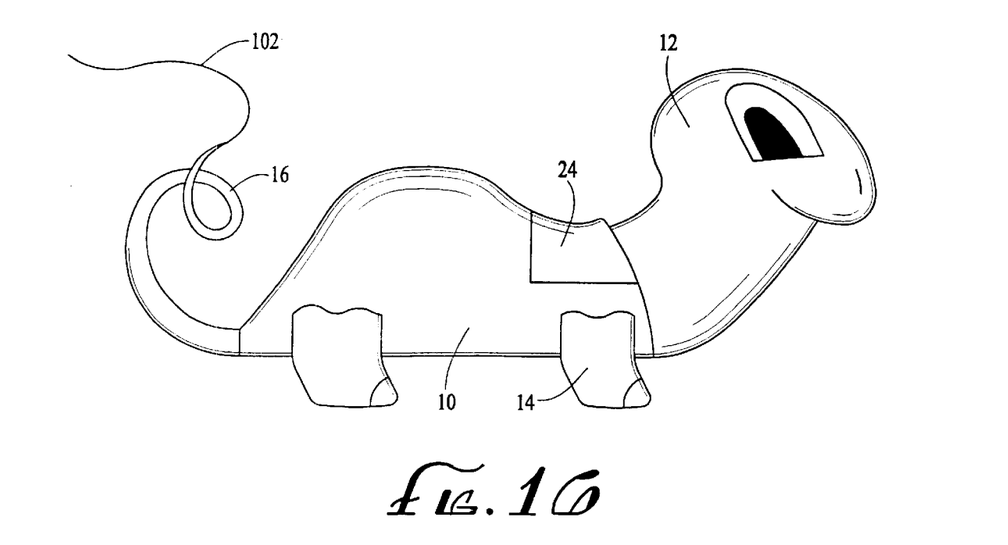
FIG. 16 a side view of a cat body with a head of an turtle, the feet from an elephant and a tail from a pig.

FIG. 16 is a further illustration of the interchangeability of the parts to construct a hybrid animal comprising a cat body 10, a turtle head 12, elephant feet 14 and a pig tail 16. The combinations of body, head, feet and tails, as well as other interchangable parts, such as ears, fins, wings, or other components, inherent in the teachings herein, are unlimited. It is contemplated that an GUI incorporating features of the invention may be provided as a separate unit or multiple body parts can be provided as part of a kit supplying numerous interchangeable components. These parts can be attached to a body or bodies which include all the necessary electronic parts necessary for providing a fully functional GUI in the absence of any of the added components.

Although the present invention has been described in considerable detail with reference to certain preferred versions thereof, other versions are possible. For example, it is not necessary that the invention be limited to a computer mouse or track ball. Other graphic user interfaces, such as those incorporating optical, optomechanical, or pressure sensitive pads, may be used. Further, the device need not be hard wired to the computer but may communicate with the computer by light beam or radio transmission. Also, while the invention is illustrated using animals and animal parts, other devices that appeal to children such as dinosaurs, cartoon characters, cars or trucks, robots, or other items which lend themselves to interchangability of parts to change the unit appearance may be used. Therefore, the spirit and scope should not be limited to the description of the versions set forth herein.

We claim:

1. In a computer system having two functional graphic user interfaces attached thereto to control computer screen implemented functions, a first graphic user interface comprising a standard mouse or roller ball and a second graphic user interface comprising an XY generator enclosed in a body, said body adapted to receive removable appendages attached thereto, the body with appendages attached having the appearance of a toy figure, the first and second graphic user interfaces being adapted to function independently.

2. The computer system of claim 1 wherein one of the first or second graphic user interface includes switch means electrically disconnect and reconnect the first or second graphic user interface from the computer system without mechanically disconnecting said graphic user interface to interrupt transmission of signals from said graphic user interface to said computer system, allowing the other graphic user interface to operate without interference.

3. The computer system of claim 1 wherein the second graphic user interface includes an illuminating device which lights in response to activation of buttons mounted in the body.

4. The computer system of claim 1 wherein the second graphic user interface is a track ball device and includes sound generating means which are activated by movement of a ball in the track ball device, said movement of the ball providing XY instructions to the computer system.

5. The computer system of claim 1 wherein the second graphic user interface wherein the toy figure is selected from the group consisting of a turtle, lady bug, bird, cat and combinations thereof, the appendages thereon being interchangeable.

6. The computer system of claim 3 wherein the illuminating device which lights is within one or more of the appendages, said appendages being joined to the body by connections including electrical connections for providing transmission of electrical signals.

7. A kit for the modification of a graphic user interface, the graphic user interface being adapted to receive attachments, the kit including multiple components attachable to the graphic user interface, one or more of the attachments being functional components connectable to the graphic user interface by attachment means including electrical connections for transmission of electrical signals.

8. A kit for the modification of a graphic user interface, the kit including:

(a) a body for placement over the graphic user interface without interfering with the normal operation of the graphic user interface, the body adapted to receive attachments, and (b) a multitude of components attachable to the graphic user interface, one or more of said attachments including functional components responsive to the operation of the graphic user interface.

9. A reconfigurable mouse or roller ball device for controlling the operation of a computer system comprising a body and removable and replaceable appendages to change the appearance of the mouse or roller ball device, the body including means to move a cursor on a computer screen, where one or more of the removable and replaceable appendages are functional in that they include signal transmission means and/or have the capability to emit sound or light in response to an input provided by the mouse or roller ball with attached appendages.

* * * * *